UNITED STATES PATENT OFFICE.

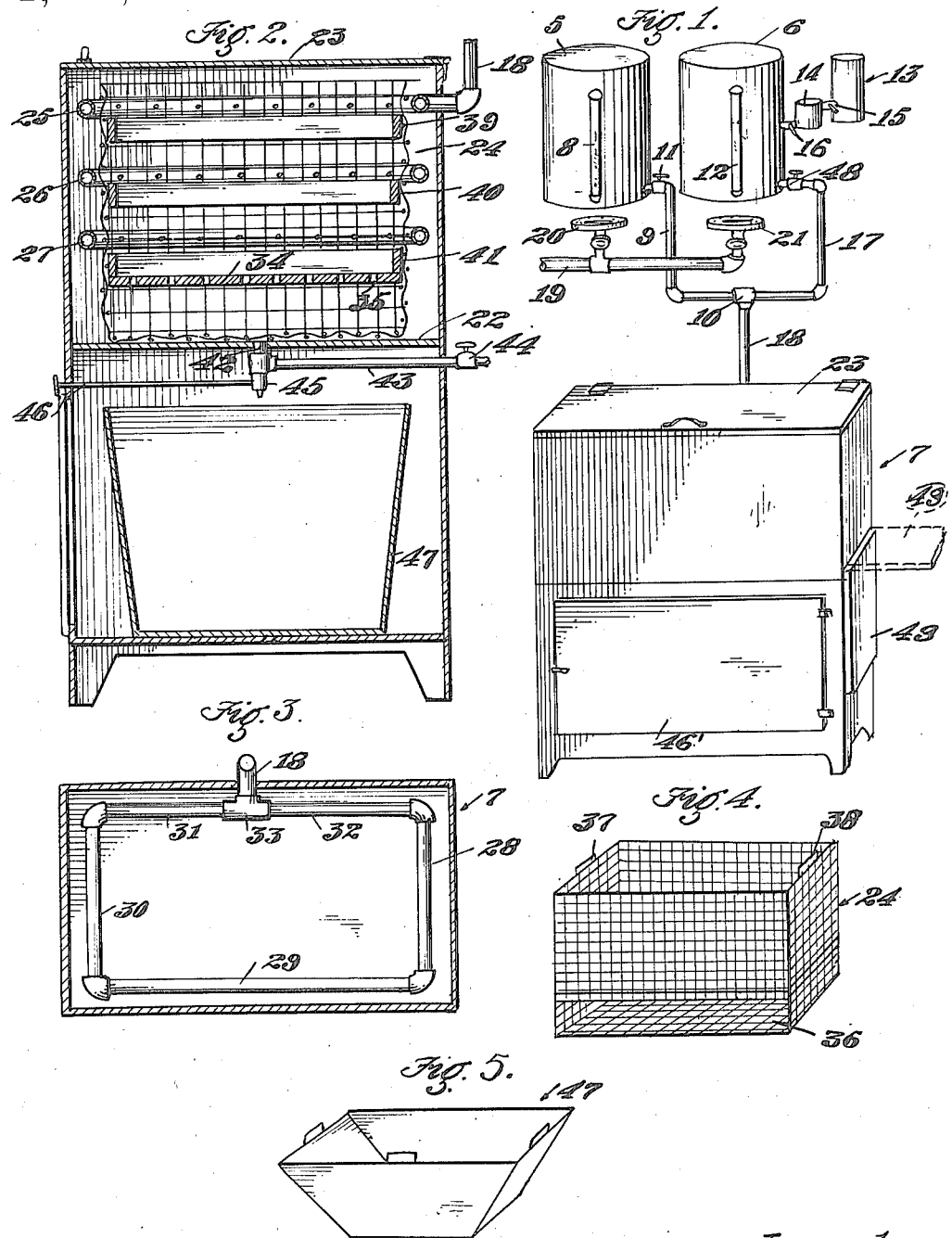

NICHOLAS ZANINOVICH, OF LOS ANGELES, CALIFORNIA.

DISH-WASHING MACHINE.

1,162,966.  Specification of Letters Patent.  Patented Dec. 7, 1915.

Application filed March 29, 1915. Serial No. 17,619.

*To all whom it may concern:*

Be it known that I, NICHOLAS ZANINOVICH, a citizen of the United States, residing at Los Angeles, in the county of Los Angeles and State of California, have invented new and useful Improvements in Dish-Washing Machines, of which the following is a specification.

This invention relates to a dish washing machine and especially to a dish washing machine which is adapted for family use.

It is an object of this invention to provide a dish washing machine which does not require handling of the dishes except to place them in the washer and remove them therefrom.

It is another object of this invention to provide a washing machine which does not require mechanical agitation of the water during the time the dishes are being washed.

It is a further object to provide a dish washing machine in which water can be used, the temperature of which is at the boiling point.

It is a further object to provide a dish washing machine in which a basket having two compartments is provided, one compartment adapted to contain dishes and another for silverware, and also to provide a receptacle for kitchen receptacles such as pots, kettles and pans.

I attain these objects by means of the dish washer illustrated in the accompanying drawing, in which:

Figure 1 is a perspective view of an embodiment of my invention. Fig. 2 is a vertical cross section through the cabinet. Fig. 3 is a horizontal section through the dish compartment. Fig. 4 is a perspective view illustrating a modified form of dish and silverware basket. Fig. 5 is a perspective view illustrating the pot and pan receptacle.

More specifically, 5 designates a reservoir adapted to contain clear water.

6 is a reservoir for soapy water and 7 the cabinet adapted to contain the utensils to be washed.

Clear water reservoir 5 is here shown as cylindrical in form, but may have any other form, and is provided with a sight indicator 8 which is comprised of a glass tube connected at the lower and upper ends to the reservoir, so that the level of the water in the reservoir may be observed.

A conduit 9 is connected at the lower end of the reservoir and to a T 10. Valve 11 for controlling the flow of water from reservoir 5 is located in conduit 9. A reservoir 6, here shown as cylindrical in form but which may be of any other form, has secured thereto a sight indicator 12 of a construction similar to sight indicator 8.

A soap dispensing reservoir 13 is connected to a measuring receptacle 14 by means of a valve controlled conduit 15, and measuring receptacle 14 is connected to reservoir 6 by a valve controlled conduit 16.

Connected to the lower end of reservoir 6 and to T 10 is a conduit 17 with a valve connected therein. Connecting T 10 and the cabinet is a conduit 18.

Pipe 19 conducts fluid fuel to burners 20 and 21 disposed beneath reservoirs 5 and 6 respectively for heating the water in the reservoirs.

The dish washing cabinet 7 consists of a rectangular body divided into two compartments by a wall 22. The upper compartment is provided with a hinged cover 23 whereby the basket 24 may be introduced into and removed from the cabinet. Disposed in horizontal planes within the upper compartment are spray tubing 25, 26 and 27. Each layer of spray tubing is composed of a closed system of tubing having perforations adapted to allow thin streams of water to issue therefrom; they may be formed of pipes 28, 29, 30, 31 and 32, connected by elbows and by means of a T 33 to conduit 18.

The basket 24 is constituted of wire netting with a bottom 34 of wood, having perforations 35 disposed therein. The side wall of the basket is open at the lower end as indicated at 36, so that silverware may be introduced into the bottom of the basket. Suitable handles may be provided for carrying the basket when removed from the cabinet as indicated at 37 and 38 in the modified form shown in Fig. 4. Within the basket are horizontally disposed slats of wood 39, 40 and 41 which prevent contact of the dishes with the wire netting. It has been found that if the dishes are permitted to contact with the wire, rust spots are formed thereon, wherefore, I have preferably provided the wooden slats to prevent spotting of the dishes. The modified form of basket shown in Fig. 4 is not provided with wooden slats, but is, otherwise, the same as the preferred form shown in Fig. 2. A conduit 42 is connected to the partition wall 22 and to bypass pipe 43 having a valve 44. A valve 45 having a long stem 46 so that it may be operated from the outside of the cabinet, is connected to control conduit 42.

A hinged door 46' is provided for the lower compartment of the cabinet, so that the pot and pan receptacle 47 may be introduced therein. Receptacle 47 is imperforate and provided with suitable handles for carrying the same when the receptacle is removed from the cabinet. Upon one of the side walls of cabinet 7 I provide a hinged shelf 49 upon which the receptacles, especially the dish receptacle, may be placed when removed from the cabinet.

My improved dish washer is used by removing the basket 24 from the cabinet, placing the dishes therein, in the upper compartment, the silverware in the lower compartment. The basket is now carried to the cabinet 7, placed in the upper compartment and cover 23 closed. If it is desired to wash the kettles and pans and other cooking utensils, they are placed in receptacle 47 which is placed in the lower compartment of the cabinet 7 and the door 46' closed. Valve 48 is now closed to prevent the liquid from entering the cabinet from reservoir 6. The valve in conduit 15 is opened permitting the soap which is preferably liquid soap, to fill measuring receptacle 14. Valve conduit 15 is then closed and valved conduit 16 opened to permit the soap to enter the reservoir 6. Sufficient water is admitted to reservoir 6 for one washing of dishes. In actual practice reservoir 6 will be constructed to hold about five gallons of water, while the soap reservoir 13 will hold approximately one gallon, and the measuring receptacle 14 having a capacity of one pint. Valve 11 is closed and reservoir 5 then filled with water. Reservoir 5 will have a capacity of approximately five gallons.

Burners 20 and 21 are now lighted to heat the water in reservoirs 5 and 6. When the water has reached the boiling point valve 48 is opened, admitting the hot soapy water through conduits 17 and 18 to the spray tubing 25, 26 and 27, thereby spraying the dishes with hot soapy water, the temperature being that of boiling water, whereby the dishes are thoroughly cleansed. The water from the dishes passes over the silverware in the lower compartment, and if it is not desired to clean the kitchen utensils, valve 45 is closed and valve 44 opened, permitting the water to drain to the outside, where it may pass into a receptacle such as a bucket, and be used for washing the floors. If it is desired to wash the kitchen utensils, valve 44 is closed and valve 45 opened, admitting the hot water to receptacle 47. To rinse the dishes, valve 11 is opened, permitting the hot clear water to be sprayed over the dishes through spraying tubing 25, 26 and 27.

If desired, conduit 9 may be connected to the range boiler and water used from the range boiler instead of from a special reservoir. After the dishes have been rinsed, cover 23 is lifted and the basket 24 removed from the cabinet and placed upon the shelf 48. Due to the high temperature of the water, the dishes dry and they are now in condition to be again used. It may be found convenient to wash the dishes just before using them on the table, when the heat from the water will have warmed them, so that a warming oven will not be necessary where my dish washer is used.

What I claim is:

In a dish washing machine, the combination of means for supplying washing fluid, a cabinet divided by an imperforate horizontal partition into an upper and lower chamber, spray conduits disposed on the walls of said upper compartment and connected to said means for supplying the washing fluid, a perforate basket removably mounted in said upper compartment, a drain conduit mounted in said horizontal partition connecting the upper and lower compartments, a by-pass conduit connected to said drain conduit and leading outside of said cabinet, and valves for controlling said drain conduit and said by-pass conduit.

In witness that I claim the foregoing I have hereunto subscribed my name this 10th day of March, 1915.

NICHOLAS ZANINOVICH.

Witnesses:
ERNEST L. WALLACE,
MARGUERITE BATES.